United States Patent Office 3,674,522
Patented July 4, 1972

3,674,522
MASONRY MATERIALS THAT RESIST EFFLORESCENCE AND ARE COLORED WITH INCREASED INTENSITY AND PERMANENCE, AND METHODS OF PRODUCING SUCH MATERIALS
Johannes Petrus Brants, Apeldoorn, and Johan van der Meulen, Amsterdam, Netherlands, assignors to Akzo N.V., Arnhem, Netherlands
No Drawing. Filed Feb. 22, 1971, Ser. No. 117,695
Claims priority, application Netherlands, Feb. 25, 1970, 7002633, 7002634
Int. Cl. C04b 7/56
U.S. Cl. 106—90          25 Claims

ABSTRACT OF THE DISCLOSURE

Efflorescence of masonry structures composed of cold-hardened masonry materials, such as, concrete, sand-lime bricks, asbestos cement and cement plasterwork, or of stone or fired bricks, is suppressed by the condensation product of at least one alkylene polyamine and/or polyalkylene polyamine, and epichlorhydrin. The condensation product in the form of an aqueous or more volatile solution thereof may be applied to the surfaces of the masonry structure or, in the case of such structures composed of cold-hardened materials, is preferably incorporated in such material prior to the hardening or setting thereof. The condensation product is further found to increase the coloring power and permanence of pigments when added with the latter to cold-hardening materials prior to the hardening or setting thereof.

---

This invention relates generally to masonary structures, for example, of concrete, sand-lime bricks, asbestos cement, cement plasterwork, stone or fired bricks, and more particularly is directed to reducing the tendency of such masonry structures to effloresce. The invention is further concerned with improving the coloring or pigmenting of "cold-hardening" or "cold-hardened" masonry materials.

As used herein, the term "cold-hardening" masonry materials is intended to mean materials which, in use, are slurried with water and thereafter will set to form "cold-hardened" materials without being subjected to firing at high temperatures. The use of moderate heating or a steam treatment to reduce the setting time will not preclude the inclusion of a material thus treated within the term "cold-hardened" materials, provided that setting does not require firing at high temperatures. The defined term includes such materials before setting and in the set condition, and examples of the included masonry materials are concrete, sand-lime brick, asbestos cement, hardened mortar and cement-plasterwork.

Masonry structures of the above-mentioned cold-hardening materials or of other masonry materials such as stone or fired bricks, may effloresce when exposed to varying climatic conditions. The efflorescence found on mortar and concrete surfaces is usually calcium carbonate, whereas the efflorescence found on brickwork is of the sulphate type and is composed of gypsum (hydrated calcium sulphate) and other alkaline sulphates. The efflorescence typically causes the appearance of an irregular pattern of white or gray surface stains. These stains are particularly unsightly when the material is otherwise of a dark color.

Various substances have been proposed for addition to fresh concrete or mortar to deter efflorescence of such masonry materials when set. For example, Swiss Pat. No. 395,839 discloses the addition of polyvinyl propionate; U.S. Pat. No. 3,135,617 proposes the addition of colloidal silica; and Dutch patent application No. 6509-686 discloses the addition of a mixture of coniferous softwood residues and asphalt. However, these previously proposed additives are not as effective as desired in preventing efflorescence.

Further, it has been proposed to avoid effluorescence of masonry structures by the application of external or surface coatings thereto, for example, of a basic amine such as triethanolamine, as in German patent specification No. 1,059,825, a sugar solution, as in German patent specification No. 366,697, or a mixture of lubricating oil, kerosene and acetic acid, as disclosed in U.S. Pat. No. 2,218,933. However, these surface coatings are not truly effective in avoiding efflorescence and are not reliably maintained on the surfaces of the masonry structures to be protected thereby.

It is also known that "cold-hardened" masonry materials, such as concrete and the like, can be colored by adding pigments to the fresh concrete or mortar. The quantity of pigment thus added is usually from 0.5% to 10%, by weight, of the amount of cement. Suitable pigments include black iron oxide, manganese black and carbon black for obtaining a dark to black color; ultramarine blue, phthalocyanine blue and cobalt blue for obtaining a blue color; chromium hydroxide and phthalocyanine green for obtaining a green color; red iron oxide for obtaining a red color; ferrosoferric oxide for obtaining a brown color; and ferric hydroxide and Naples yellow for obtaining a yellow color.

Pigmented "cold-hardening" masonry materials are increasingly used to obtain a particular aesthetic effect and also to give visual prominence to certain elements or parts of a structure, for example, for the marking of roads or dangerous obstacles. The incorporation of the pigments into the concrete or the like achieves a more permanent coloring thereof, as compared with merely painting or coating the concrete with a coloring agent or paint.

However, it has been found that even the incorporation of pigment into concrete and similar masonry materials does not always completely overcome the problem of loss of color upon exposure to the atmosphere by reason of the fact that concrete, sand-lime brick and similar materials may exhibit efflorescence when exposed to a varying climate or weathering. As stated above, the surface of the material develops an irregular pattern of white or gray stains and this is unsightly, especially on an otherwise colored or dark material.

Accordingly, it is an object of this invention to effectively avoid efflorescence of masonry structures which are composed of cold-hardened masonry materials, such as, concrete, sand-lime bricks, asbestos cement and current plasterwork, or of other masonry materials such as stone or fired bricks.

Another object is to provide anti-efflorescence agents which are effective when included in the mixes of cold-hardened masonry materials or when employed as coatings for the masonry structure, as when the latter is composed of stone or fired bricks.

A further object is to enhance the permanence and intensity of coloring achieved by the incorporation of pigments in concrete and other cold-hardening masonry materials.

We have found that the foregoing objects can be realized through the use, as anti-efflorescence agents for masonry materials, of condensation products of at least one alkylene polyamine and/or polyalkylene polyamine, and epichlorhydrin. More specifically, we have found that such condensation products are very effective to prevent efflorescence of masonry materials, for example, when incorporated in the mixes of cold-hardening materials, or when applied to the surfaces of the resulting masonry structures, as in the case of stone or fired brick structures.

We have further found that the coloring power of pigments in concrete, sand-lime brick, asbestos cement and similar cold-hardened materials is increased and, in addition, the color permanency of the pigmented materials is improved when, in addition to the pigment, at least one of the above-mentioned condensation products of an alkylene polyamine and/or polyalkylene polyamine and epichlorhydrin is incorporated in the material.

In accordance with one aspect of the invention, there is provided a masonry material which comprises brick, stone, concrete and/or cement and, as an anti-efflorescence agent therefor, a condensation product of at least one alkylene polyamine and/or polyalkylene polyamine, and epichlorhydrin.

Another aspect of the invention provides a method of preventing efflorescence of a masonry material which comprises applying to, or incorporating in such material a condensation product of at least one alkylene polyamine and/or polyalkylene polyamine, and epichlorhydrin.

A further aspect of the invention provides a cold-hardening masonry material (as herein defined) having incorporated therein a pigment and a condensation product of at least one alkylene polyamine and/or polyalkylene polyamine, and epichlorhydrin.

The invention also provides a method of enhancing the color intensity and permanence of a cold-hardening masonry material, which method comprises forming a mixture of the cold-hardening masonry material which has not set, a pigment, and a condensation produced of at least one alkylene polyamine and/or polyalkylene polyamine, and epichlorhydrin.

In practicing the method according to the invention, the anti-efflorescence agent can be applied to the surfaces of a completed masonry structure or to the surfaces of the masonry materials assembled to form the structure, for example, to the surfaces of concrete blocks, sand-lime bricks, stone blocks or fired bricks. The agent may be in the form of an aqueous or more volatile solution, and the application of the solution may be carried out, for example, by brushing or spraying. After gelling and/or hardening and drying, a layer is formed on the treated surfaces which cannot be washed off with water. Although good results are obtained in this way, application of the agent to masonry structures or formed elements has the disadvantage that the layer thus applied may be damaged or become detached or ultimately deteriorate by weathering, so that the anti-efflorescence action thereof is partly or wholly lost. Therefore, the condensation product is preferably incorporated in the masonry material rather than being simply applied to the surface thereof. Thus, for example, the condensation product, or an aqueous solution thereof, may be introduced into the cement mixture such as, a concrete or mortar, after which the cement mixture containing the agent is left to harden. If desired, the epichlorhydrin and the alkylene polyamine and/or polyalkylene polyamine can be added separately and allowed to react in situ in the cement mixture.

Without being bound to the following theory, we believe that when the epichlorhydrin and the alkylene and/or polyalkylene polyamine are mixed, a precondensate is first rapidly formed. This precondensate is then converted, at a slower rate, into the polymer. Possibly, the final polymer is formed only during the hardening of the cement mixture or, when the anti-efflorescence agent is applied as a surface layer, during drying of the layer.

Obviously, the agent can only be incorporated into those masonry materials which are "cold-hardening," that is, which, after incorporation of the agent, are not exposed to such high temperatures that the organic condensation product would decompose or otherwise be destroyed. Thus, the anti-effluorescence agent according to the invention cannot satisfactorily be incorporated in raw materials which are, for example, burnt at high firing temperatures to form, for example, kiln-fired bricks. Such bricks can be treated, of course, by applying the agent to their surfaces after the filing thereof.

Examples of polyamines which may be used for the preparation of the condensation products are tetraethylene pentamine (TEPA), pentaethylene hexamine (PEHA), triethylene tetramine (TETA), diethylene triamine (DETA) and ethylene diamine (EDA). A mixture of two or more of these amines can also be used. TEPA or technical TEPA, which is a mixture of polyalkylene polyamines with an average stoichiometric composition equivalent to TEPA, is preferred.

The molar ratio of the alkylene polyamine and/or polyalkylene polyamine to the epichlorhydrin may be in the range from 0.3:1 to 2.1:1 and is preferably in the range from 0.5:1 to 1.5:1.

When the anti-efflorescence agent is to be applied to surfaces of masonry structures or previously formed masonry elements or materials, it is preferred to use a molar ratio of the polyamine to epichlorhydrin which is less than 1:1 as the lower molar ratios result in surface coatings or layers that set more rapidly than agents having larger molar ratios.

When incorporated in a masonry material, at least 0.05%, by weight, of the condensation product, based on the weight of dry cement in the masonry, is employed. The upper limit of the amount of condensation product added to the masonry material is not critical, but more than 10% by weight is usually not necessary. Preferably, from 0.15 to 3%, by weight, of the condensation product, based on the weight of dry cement, is used. Generally, an aqueous solution of the condensation product is introduced into the cement mixture.

As already stated, between 0.5 and 10%, by weight, of pigment, based on the weight of dry cement, has in the past been used to color cold-hardening masonry materials. However, when the condensation product according to this invention is incorporated in addition to the pigment, the hardened concrete or mortar is found to have a much brighter or more intense color than concrete or mortar to which the same quantity of pigment has been added without the condensation product. This means that, in the method according to the invention, less pigment need be used than has hitherto normally been required to obtain the same coloring effect. In the method according to the invention, the quantity of pigment is preferably from 0.2 to 5%, by weight, based on the weight of dry cement. Thus, for example, in a particular case in which, when giving concrete a black color by the usual method of incorporating carbon black therein, optimum blackening was obtained with 3%, by weight, of carbon black, based on the amount of dry cement in the concrete mix, the addition to the concrete mix of 0.5%, by weight, based on the amount of cement in the mix, of a polyalkylene polyamine/epichlorhydrin condensate in the concrete, made it possible to obtain optimum blackening with only 2%, by weight, of the carbon black and, moreover, the black color was more intense or deeper.

The addition of the described condensation products in pigmented masonry materials results in improved color permanency. This latter effect is believed to be due to the anti-efflorescence action of the condensation products. The surprising increase in the coloring capacity of pigments in concrete and similar masonry materials cannot, however, be explained by this anti-efflorescence action of the condensation products.

The condensation products for incorporation in, or application to the surfaces of masonry materials in accordance with this invention may be easily prepared, for example, as follows:

The alkylene polyamine and/or the polyalkylene polyamine is dissolved in water and then the desired quantity of epichlorhydrin is added slowly, while stirring, at a temperature of from 10° to 70° C. The mixture is allowed to go on reacting for a time while stirring is continued. The clear aqueous solution thus obtained, which may, for example, contain about 10% by weight of condensation product, may then be evaporated on a steam bath or in vacuo at 70° C. to give a more highly concentrated solution. Alternatively, the quantity of water used in the process can be so chosen that, on completion of the reaction, a solution having the desired final concentration of condensation product is obtained.

Specific illustrative condensation products for use in accordance with this invention were produced as follows:

CONDENSATE A 80 kg. of TEPA were dissolved in 90 kg. of water. At a temperature between 55° and 60° C., over a period of 30 minutes, 40 kg. of epichlorhydrin were added to this mixture, while stirring. After the addition of the epichlorhydrin, stirring was continued at 55° C. for a further 30 minutes. On cooling to ambient temperature, there was obtained a clear watery liquid containing about 55%, by weight, of condensate A having a tetraethylene pentamine/epichlorhydrin molar ratio of approximately 1:1.

CONDENSATE B 8 kg. of TEPA were dissolved in 184 kg. of water. At a temperature of 15° to 20° C., over a period of 1 hour, 8 kg. of epichlorhydrin were added to this mixture, while stirring vigorously. After the addition of epichlorhydrin, stirring was continued for a few hours. The solution obtained, containing 8% by weight of condensate B, was evaporated in vacuo at 70° C. until it contained 30% by weight of condensate B. If desired, evaporation can be continued until a solution containing 50 to 80% by weight of condensate B is obtained. The obtained condensate B has a tetraethylene pentamine/epichlorhydrin molar ratio of approximately 0.5:1.

CONDENSATE C

The same procedure was followed as is described in connection with the production of condensate A, except that 27 kg. of EDA were used instead of 80 kg. of TEPA. The resulting condensate C has an ethylene diamine/epichlorhydrin molar ratio of approximately 1:1.

CONDENSATE D 96 kg. of TEPA were dissolved in 135 kg. of water. This solution was caused to react with 40 kg. of epichlorhydrin in the same manner and under the same conditions as described above in the preparation of condensate A. There was obtained a solution containing about 50% by weight of condensate D having a tetraethylene pentamine/epichlohydrin molar ratio of approximately 1.2:1.

CONDENSATE E 103 kg. of DETA were dissolved in 240 kg. of water. This solution was reacted with 155 kg. of epichlorhydrin in the same manner and under the same conditions as described in the preparation of condensate A. There was obtained a solution containing about 50%, by weight, of condensate E having a diethylene triamine/epichlorhydrin molar ratio of approximately 0.6:1.

The availability of the condensation products in the form of aqueous solutions can be advantageously utilized to alleviate some problems associated with the incorporation of pigments in concrete or mortar. To this end, before being incorporated in the concrete or mortar, the pigment is combined with the aqueous solution of the condensation product. The mixture thus obtained is then mixed into the concrete or mortar without the dust problems that usually arise when a pigment, for example, carbon black, is mixed with concrete or mortar. Further, the dispersion of the pigment in the concrete or mortar mix is facilitated by the initial combining of the pigment with the solution of the condensation product. It is also found that handling of an aqueous solution of the condensation product is facilitated by its combination with the pigment. This advantage results from the fact that the absorptive capacity of various pigments is so great that, when the pigment is combined with an aqueous solution of the condensation product in those proportions which are desired for use in concrete, an apparently dry loosely granular product is obtained. This apparently dry, loosely granular product can be packed, transported and handled more easily than the pigment and the aqueous solution of the condensation product separately. More particularly, when carbon black is used as a black pigment in concrete and similar masonry materials, the above advantages of the premixing of the pigment and condensation product are especially realized. Even in those cases where the pigment does not have sufficient absorptive capacity to give an apparently dry, loosly granular product when combined with a concentrated aqueous solution of the condensation product in the proportions desired for the purpose, premixing still has the advantages of better and speedier dispersion and the avoidance of the dust problem.

Mixing of the pigment and the aqueous solution of the condensation product can be performed conventionally in known mixing or stirring devices, for example, in an "Eirich" mixer.

It should be noted that incorporation of the condensation product in a concrete or mortar mix has been found to improve the plasticity and flow of the mix.

The invention will now be further described with reference to the following illustrative examples:

Example I

A mortar mixture (hereinafter identified as Mixture 1) comprising one part of portland cement, 3 parts of sand and 0.4 part of water (parts by weight) was prepared. A mixture (hereinafter identified as Mixture 2) of the same proportions of cement, sand and water was also prepared with, in addition, a sufficient amount of the aqueous solution containing 55% by weight of condensate A to provide the resulting mixture with 0.6%, by weight, of the condensation product, based on the weight of dry cement. Two mixtures (hereinafter identified as Mixtures 3 and 4) were prepared to be similar to Mixture 2, but in which, instead of condensate A, the condensates C and D, respectively, were incorporated in respective quantities of 1.0% and 2.0%, by weight, based on the weight of dry cement. A number of iron moulds were filled with these four Mixtures 1–4 and were then vibrated. After the mortars had hardened, the specimens were removed from the moulds and placed in the open air (maritime climate of Holland). After six months, the mouldings made of Mixture 1 were found to be clearly effected by efflorescence, whereas those made of the Mixtures 2, 3 and 4 showed no efflorescence.

At the time of placing the mortar in the moulds, it was found that the Mixtures 2, 3 and 4 had a better plasticity and therefore "flowed" better than Mixture 1.

Example II

A wall of sand-lime bricks having a sand/lime weight ratio of 10:1, and which showed a strong tendency to efflorescence, was brushed clean with very dilute hydrochloric acid and then washed down with very dilute ammonia and finally rinsed with water. One half of the wall thus freed of efflorescence was coated with the aqueous solution containing 30%, by weight, of condensate B. After several months' exposure to the weather, the untreated part of the wall was found to have again become affected by efflorescence, whereas no efflorescence was detectable on the treated part.

Example III

A wall built of kiln-fired river clay bricks was treated with the aqueous solution containing 30%, by weight, of condensate B, in the same manner as described in Example II. After six months, efflorescence stains were found on the untreated part of the wall but not on the treated part.

Example IV 25 kg. of carbon black available commercially under the trade name Ketjenblack KP7, the Ketjen Carbon N.V., the Netherlands, were placed in the rotatable stainless steel pan of an Eirich mixer. During operation of the mixer, 11.5 kg. of an aqueous solution containing about 55%, by weight, of condensate A were added over a period of 25 minutes. Operation of the mixer was then continued for a further 5 minutes. An apparently dry, loosely granular product was obtained, in which the ratio of carbon black to condensate was 4:1, by weight.

A mortar mixture was prepared, comprising 1 part of portland cement, 3 parts of sand, and 0.4 part of water (parts by weight). Quantities of the loosely granular carbon black/condensate mixture was mixed with four portions of this mortar such that the mortar mixtures, hereinafter referred to as mixtures of a, b, c and d, respectively contained 1, 2, 3 and 4%, by weight, of carbon black, based on the amount of dry cement, and therefore respectively contained 0.25, 0.5, 0.75 and 1.0%, by weight, of condensate A. Four additional mixtures e, f, g and h were respectively prepared from the described mortar mixture and 1, 2, 3 and 4%, by weight, of carbon black (Ketjenblack KP7) based on the amount of dry cement. A number of iron moulds were filled with the eight mortar mixtures a–h and then vibrated. After hardening, the specimens were demoulded. Immediately after demoulding, the specimens were visually inspected and compared with one another as to color. They were then placed in the open air (maritime climate of Holland), and thereafter visually inspected and compared with one another at regular intervals.

The observations directly after demoulding, and after six months, are summarized in the below Table A. For clarification, the percentage quantities of carbon black and condensation products in each mixture are also included in the table:

TABLE A

| Mixture | Percent carbon black (by weight) | Percent condensation product (by weight) | Visual Inspection for color after demoulding | After 6 months |
|---|---|---|---|---|
| a | 1 | 0.25 | Grey to black | Grey. |
| b | 2 | 0.5 | Intense black | Black. |
| c | 3 | 0.75 | do | Do. |
| d | 4 | 1.0 | do | Do. |
| e | 1 | None | Grey | Effl. |
| f | 2 | None | Grey to black | Effl. |
| g | 3 | None | Black | Effl. |
| h | 4 | None | do | Effl. |

Effl.=efflorescence.

After six months' exposure to the weather, the specimens e to h showed a blotchy grey efflorescence. Even after a week's exposure in the open air, the differences in color between the specimens made from mixtures a to d and those made from mixtures e to h having become noticeably greater, with the mixtures e to h having become distinctly greyer in color.

Hardly any difference in blackness was found between the mixtures b, c and d. There was hardly any difference in blackness between the mixtures g and h either, but, immediately after demoulding, these mixtures g and h were distinctly less black than the mixtures b, c and d, and the difference in color became greater and greater during exposure in the open air.

Example V

Five mortar mixtures i–m were prepared with a water/cement ratio of 0.4:1 and a sand/cement ratio of 3:1 and pigmented with carbon black (Ketjenblack KP7). Polyamine-epichlorhydrin condensation products were additionally incorporated into mixtures j, k, l and m as shown in Table B below. A number of plastic moulds were filled with the mixtures and then vibrated. After hardening, the specimens were demoulded, visually inspected for color and compared with one another. They were then placed in the open air (maritime climate of Holland) and were inspected at regular intervals. The results after demoulding and after six months are shown in Table B.

TABLE B

| Mixture | Percent carbon black (by weight) | Percent condensation product (by weight) | Visual Inspection for color after demoulding | After 6 months |
|---|---|---|---|---|
| i | 2 | None | Grey to black | Effl. |
| j | 2 | 0.5 B [1] | Intense black | Black. |
| k | 2 | 0.5 C [1] | do | Do. |
| l | 2 | 1.0 C [1] | do | Do. |
| m | 2 | 0.5 D [1] | do | Do. |

[1] The letters B, C and D refer to the condensation products whose preparation has been described above.

Example VI

Two mortar mixtures n and p were prepared with a water/cement ratio of 0.4:1 and a sand/cement ratio of 3.0:1 and each pigmented with 5%, by weight, red iron oxide, based on the amount of dry cement. In addition, 0.5%, by weight, of condensate A, based on the dry cement, was incorporated in mixture p. Moulded specimens were made from these mixtures and, after hardening, were visually inspected for color, both immediately after demoulding and periodically after prolonged exposure in the open air (maritime climate of Holland). Mixture p, immediately after demoulding, was found to have a brighter red color than mixture n. After three months' exposure, this difference in color was found to have distinctly increased. After six months' exposure, the specimens of mixture p still had a uniform bright red color without any trace of efflorescence, whereas the specimens of mixture n had acquired a greyish red tinge.

Example VII

The procedure of Example VI was repeated to provide mixtures q and r containing yellow ferric hydroxide instead of red iron oxide. Mixture r additionally contained the stated amount of condensation product A. Again the specimens containing the condensation product (mixture r), were, on removal from the moulds, found to have a brighter yellow color than the specimens not containing the condensation product (mixture q). The specimens of mixture r preserved this fine yellow color even after long exposure to the weather, whereas those of mixtures q were distinctly less bright in color after only a few months.

Example VIII

Two mortar mixtures x and t were prepared with a water/cement ratio of 0.4:1 and a sand/cement ratio of 3:1, and pigmented with 2%, by weight, of carbon black based on the amount of dry cement. Condensate E was additionally incorporated into mixture t in an amount of 2%, by weight, based on the dry cement. Plastic moulds were filled with each of the mixtures and were then vibrated. After hardening the specimens were demoulded, visually inspected for color and compared with one another. They were then placed in the open air (maritime climate of Holland) and were inspected after six months. The results after demoulding and after six months are shown in Table C.

TABLE C

| Mixture | Percent carbon black (by weight) | Percent condensate E (by weight) | Visual Inspection for color after demoulding | After 6 months |
|---|---|---|---|---|
| s | 2 | None | Grey to black | Effl. |
| t | 2 | 2 | Intense black | Black. |

What is claimed is:

1. The combination of an efflorescent masonry material and, as an anti-efflorescence agent incorporated therein or on the surface thereof, an effective amount of a condensation product of epichlorhydrin and at least one amine selected from the group consisting of alkylene polyamines and polyalkylene polyamines with the molar ratio of said at least one amine to said epichlorhydrin in said condensation product being in the range between approximately 0.3:1 and 2:1.

2. The combination according to claim 1, in which said range is from approximately 0.5:1 to 1.5:1.

3. The combination according to claim 1, in which said masonry material is capable of cold hardening.

4. The combination according to claim 3, in which said cold hardening masonry material has said condensation product incorporated therein.

5. The combination according to claim 4, in which said cold hardening masonry material further has a coloring pigment incorporated therein.

6. The combination according to claim 5, in which said masonry material includes cement, said condensation product is present in an amount between approximately 0.05% and 10%, by weight, based on the amount of said cement, and said pigment is present in an amount between approximately 0.2% and 5%, by weight, based on said amount of cement.

7. The combination according to claim 6, in which said amount of said condensation product is between approximately 0.15% and 3%, by weight, based on said amount of cement.

8. The combination according to claim 4, in which said masonry material includes cement, and said condensation product is present in an amount between approximately 0.05% and 10%, by weight, based on the amount of said cement.

9. The combination according to claim 8, in which said amount of the condensation product is between approximately 0.15% and 3%, by weight, based on said amount of cement.

10. The combination according to claim 4, in which said masonry material is in a flowable state.

11. The combination according to claim 4, in which said masonry material is hardened to a set condition.

12. The combination according to claim 1, in which said masonry material is set to a finite shape, and said condensation product forms a coating on the surface of said shape.

13. The combination of an efflorescent masonry material and, as an anti-efflorescence agent incorporated therein or on the surface thereof, an effective amount of a condensation product of epichlorhydrin and at least one amine selected from the group consisting of ethylene diamine, diethylene triamine, triethylene tetramine, tetraethylene pentamine and pentaethylene hexamine, with the molar ratio of said at least one amine to said epichlorhydrin being in the range between approximately 0.3:1 and 2:1.

14. The combination according to claim 13, in which said masonry material includes cement and is capable of cold hardening, and said condensation product is incorporated in said masonry material in an amount between approximately 0.05% and 10%, by weight, based on the amount of said cement.

15. The combination according to claim 14, in which said masonry material further includes a coloring pigment in an amount between approximately 0.2% and 5%, by weight, based on said amount of cement.

16. The method of avoiding efflorescence of a masonry material which is susceptible to effloresce when weathered, comprising adding to said masonry material an effective amount of a condensation product of epichlorhydrin and at least one amine selected from the group consisting of alkylene polyamines and polyalkylene polyamines with the molar ratio of said at least one amine to said epichlorhydrin in said condensation product being in the range between approximately 0.3:1 and 2:1.

17. The method according to claim 16, in which said at least one amine is selected from the group consisting of ethylene diamine, diethylene triamine, triethylene tetramine, tetraethylene pentamine and pentaethylene hexamine.

18. The method according to claim 16, in which said masonry material includes cement and is capable of cold-hardening, and said condensation product is mixed into said masonry material prior to the hardening thereof in an amount between approximately 0.05% and 10%, by weight, based on the amount of said cement.

19. The method according to claim 18, in which the amount of said condensation product mixed into said masonry material is between approximately 0.15% and 3%, by weight, based on said amount of cement.

20. The method according to claim 18, in which a powdered pigment is also mixed into said masonry material prior to the hardening thereof.

21. The method according to claim 20, in which the amount of said powdered pigment is between approximately 0.2% and 5%, by weight, based on the amount of said cement.

22. The method according to claim 20, in which said condensation product, in the form of an aqueous solution thereof, is initially mixed with said powdered pigment prior to the mixing of said condensation product and pigment into said masonry material.

23. The method according to claim 22, in which the concentration of said condensation product in said aqueous solution and the amount of said solution mixed with said powdered pigment are such as to result in an initial mixture of substantially dry, loosely granular form.

24. The method according to claim 20, in which said condensation product is in the form of an aqueous solution thereof.

25. The method according to claim 16, in which said condensation product is obtained by adding the epichlorhydrin to an aqueous solution of said at least one amine at a temperature in the range between approximately 10° and 70° C., with vigorous agitation.

References Cited

UNITED STATES PATENTS

| | | | |
|---|---|---|---|
| 3,577,313 | 5/1971 | Bolger et al. | 260—2 BP |
| 3,442,754 | 5/1969 | Espy | 260—2 BP |
| 3,403,113 | 9/1968 | Diethelm et al. | 260—2 BP |
| 3,031,505 | 4/1962 | Pollitzer | 260—2 BP |
| 2,860,160 | 11/1958 | Sundberg et al. | 106—90 |

TOBIAS E. LEVOW, Primary Examiner

W. T. SCOTT, Assistant Examiner

U.S. Cl. X.R.

106—120, 314; 117—70, 123; 260—29.2 EP